TELEVISION CAMERA LEVEL CONTROL CIRCUIT

Filed May 24, 1952

Inventor
ERIC LAWRENCE CASLING WHITE
By Ralph E. Atherton
Attorney

United States Patent Office 2,852,601

Patented Sept. 16, 1958

2,852,601

TELEVISION CAMERA LEVEL CONTROL CIRCUIT

Eric Lawrence Casling White, Iver, England, assignor to Electric & Musical Industries Limited, Hayes, Middlesex, England, a British company Application May 24, 1952, Serial No. 289,707

Claims priority, application Great Britain May 31, 1951

3 Claims. (Cl. 178—7.2)

Figure 1:
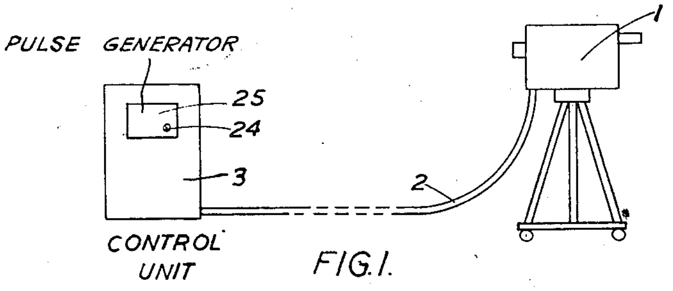

This invention relates to electrical control circuits. The invention has particular but not exclusive reference to control circuits for use with television cameras in which it is desired to effect a control at the television camera from a remote point.

In certain types of television cameras which embody pick-up tubes it is necessary to employ a high voltage on one of more of the electrodes of the tube. For example, in certain types of tubes the target electrode is scanned by a high velocity beam of electrons and in order to generate such a high velocity beam the cathode and control electrode of the pick-up tube may be required to be maintained at about 1500 volts negative with respect to earth. The camera is connected by cable to control and supply equipment and in order to reduce the size of the camera cable and the cable connectors and to improve reliability under humid conditions it is desirable to maintain the potentials on the cable at a low voltage, say under 350 volts, and to generate the high voltage necessary for operating the pick-up tube by the provision of suitable circuits at the camera. Although it is possible to generate the required high voltage at the camera, nevertheless, it is still necessary to be able to control the beam current of the pick-up tube from a point remote from the camera.

In the specification of co-pending United States patent application Serial No. 152,425, now Patent No. 2,716,152, issued August 23, 1955, an arrangement is described for effecting such a control by feeding pulses along the cable and the amplitude of said pulses is arranged to be varied in order to control the beam current of the pick-up tube. To enable these pulses to effect the desired control, the pulses after travelling along the cable are passed through a D. C. isolating condenser or transformer and the level of one extremity of the pulses is then set at a potential corresponding substantially to that of the high voltage generated at the camera by the operation of a suitable level setter, such as a diode. It is found, however, in such an arrangement that hum or other disturbances which may become superimposed on the pulse waveform may disturb the operation of the camera and the object of the present invention is to provide an improved arrangement with a view to removing hum or other disturbances which may become superimposed on the pulse waveform.

According to the present invention, there is provided an electric control circuit comprising means for generating an electrical control signal having recurrent peak extremities and intervening portions having a substantially constant value between recurrent peak extremities, means for adjusting the amplitude of said signal, means for feeding said signal through a circuit which blocks transmission of the D. C. component of said signal, a level setter subsequent to the last-mentioned circuit for setting the peaks of said signal at a fixed level, means for utilizing variations in said signal from said fixed level due to said adjustment in amplitude to effect a control subsequent to said level setter, limiting means subsequent to said level setter for limiting the amplitude of the intervening portions lying between said peaks, and means for automatically varying the limiting level in dependence on the amplitude of the said signal.

Thus by amplitude limitation, hum or other disturbances can be removed and by causing the limiting level to be varied in dependence on the amplitude of the signal, variations in amplitude as controlled by said adjusting means can be utilised to effect the desired control.

Figure 2:
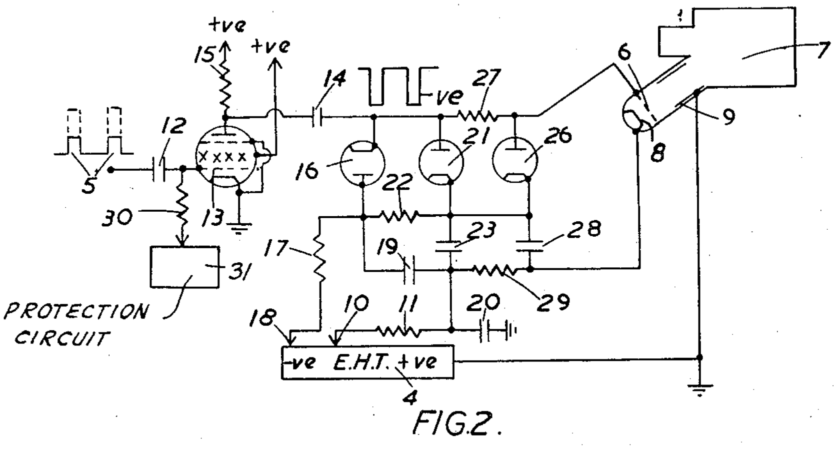
Figure 3:
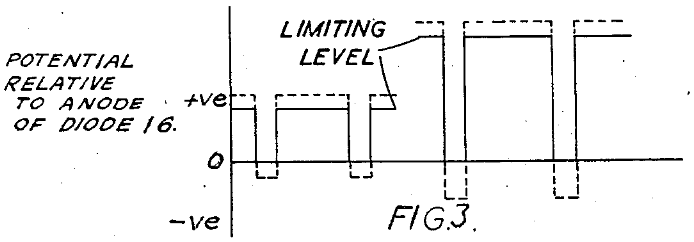

In order that the said invention may be clearly understood and readily carried into effect, the same will now be more fully described with reference to the accompanying drawings, in which:

Figure 1 illustrates diagrammatically a television camera which is connected by a cable to a control unit, Figure 2 illustrates a control circuit embodying the invention, and Figure 3 is an explanatory diagram.

As shown in Figure 1, the reference numeral 1 indicates a television camera which is connected by a cable 2 to a control unit 3 as is usual in the art. The pick-up tube employed in the camera 1 is a tube which depends for its operation on the use of high D. C. voltages which it is not desired to transmit from the unit 3, through the cable 2 for the reasons above-mentioned. Accordingly, the required high voltages are generated at the camera in any suitable manner. Preferably the high voltage generator is of the type in which an oscillator having a frequency of the order of 40 kc./s. feeds a step-up transformer the output of which is then rectified. In Figure 2 of the drawings the circuit for generating the high voltages is indicated at 4. In operating the camera 1 it is necessary to black out the electron beam of the tube during line and frame flyback periods for which purpose the control unit 3 is arranged to transmit along the cable 2 to the camera 1 control signals in the form of pulses of rectangular shape which are indicated in Figure 2 by the reference numeral 5. These pulses are required to be applied to the control elctrode 6 of the pick-up tube 7 of the camera. The tube 7 in the embodiment shown is one employing a high velocity beam of electrons and to generate such high velocity beam the cathode 8 of the tube and the control electrode 6 are normally maintained at a potential of about 1500 volts negative with respect to earth whilst the accelerating electrode 9 of the tube is earthed. The high voltage generator 4 is therefore arranged to generate such a high negative voltage which is applied to the cathode 8 from a tapping point 10 on the source 4 through resistance 11. The blackout pulses 5 require to be applied to the control electrode 6 of the tube at a negative potential level which is such as to enable said pulses to blackout the beam. The pulses 5 are not transmitted along the cable 2 at a high negative potential of the order of 1500 volts for the reasons above-mentioned, but are transmitted with zero or less than 350 volts incidental D. C. component and with an amplitude which is, say, about 20 volts. The pulses are applied through condenser 12 to an amplifying valve 13 where they are amplified and phase reversed.

In order to prevent the high voltage generated by the generator 4 from being transmitted along the cable 2, the generator 4 is isolated from the amplifier 13 and hence from the cable by means of a condenser or by means of a transformer. In Figure 2 isolation is effected by means of a condenser 14 and the anode load resistance 15 of the amplifier 13 is coupled through the isolating condenser 14 to the cathode of a level setting diode 16, the anode of which is connected through a resistance 17 to a tapping point 18 on the generator 4. The diode 16 serves to set the level of the negative extremities of the pulses 5 at the potential of the tapping point 18 on the generator 4, the pulses then being applied to the control electrode 6 of the tube 7. The end of the resistance 17 connected to the anode of the diode is connected through a by-pass condenser 19 and by-pass condenser 20 to earth as shown and likewise the tapping point 10 is connected through by-pass condenser 20 to earth. In order to remove hum or other disturbances which may become superimposed on the pulse waveform a limiter is provided which comprises a further diode 21 the anode of diode 21 is connected to the control electrode 6 via a resistance 27 (which can be omitted if the diode 26 hereinafter referred to is not employed), the cathode circuit of which is provided with a resistance 22 and a condenser 23. The negative portions of the pulses which are applied to the control electrode 6 are arranged to cause the beam of said tube to be cut-off during flyback periods and when it is desired to control the beam current of said tube the amplitude of the pulses is varied from the control unit 3 as by adjusting the control knob 24 of a pulse generator 25 contained in the unit 3 so that variation of beam current can be obtained. The positive portions of the pulses are limited in amplitude by the clipping action of limiter 21 so as to remove hum or other disturbances but in order that variation of amplitude of the pulses on adjustment of the control knob 24 can still be utilised to vary the beam current despite the provision of the limiter 21, the limiting level of the limiter 21 is automatically varied with the amplitude of the pulses. The resistance 22 and condenser 23 constitute an integrating circuit for the pulses and due to this integrating circuit the mean potential of the cathode of the diode 21 relatively to the anode of the diode 16 is rendered proportional to the amplitude of the pulses so that the limiting level of the diode 21 is automatically varied as aforesaid. The condenser 23 is sufficiently large to ensure negligible variation of potential of the cathode of the diode 21 relatively to the cathode 8 of the pick-up tube 7 during the positive portions of the pulse waveform. It may be arranged that the bias provided for the diode 21 by the integrating circuit 22 and 23 is about 50% to 90% of the pulse amplitude. If desired a further diode 26 may be included in the limiter for the purpose of improving the limiting operation, this further diode 26 being arranged in parallel with the diode 21, the anode of the diode 21 being connected to the anode of the diode 26 through a resistance 27 and to the control electrode 6 of the tube 7 whilst the cathodes of the diodes 21 and 26 are connected together as shown. The cathode of the diode 26 is connected through a coupling condenser 28 to the cathode 8 of the tube 7 and bias for the cathode 8 of tube 7 is applied from tapping point 10 through a resistance 29 which is connected to resistance 11. In Figure 3 of the drawings the operation of the limiter is indicated, from which it will be seen that for pulses of small amplitude on the left-hand side of the figure the diode 21 serves to reduce the amplitude of the pulses from the dotted line value to the solid line value and for large amplitude pulses shown on the right-hand side of the figure the limiting level is considerably increased.

The tapping point 18 on the generator 4 provides an adjustable bias for the control electrode 6 of the tube relatively to the fixed potential of the cathode 8 of the tube 7 which bias is fed to the control electrode 6 through the resistance 17. The control electrode of the amplifier 13 may be connected through a leak resistance 30 to a protection circuit 31 which serves to detect whether the line or frame scanning circuits for the tube 7 are correctly operating and if either of said scanning circuits fails then a bias is applied to the valve 12 which is sufficiently negative to reduce the gain of the valve substantially to zero. The voltage on the control electrode 6 then drops to the level of the bias applied to said electrode through the resistance 17 which bias is adjusted so as to be below the cut-off voltage of the tube 7.

Although the invention has been described above as applied to the control of a television camera, it will be appreciated that the invention is equally applicable to other circuits in which it is desired to effect a control from a remote point by means of control signals in the form of pulses.

What I claim is:

1. An electric control circuit comprising means for generating an electrical control signal having recurrent peak extremities and intervening portions having a substantially constant value between recurrent peak extremities, means for adjusting the amplitude of said signal, means for feeding said signal through a circuit which blocks transmission of the direct current components of said signal, a level setter connected to the output of the last-mentioned circuit for setting the peaks of said signal at a fixed level, limiting means connected to the output of said level setter for clipping the amplitude of the intervening portions lying between said peaks, an integrating circuit for integrating said intervening portions to provide a potential varying with the amplitude of said intervening portions, and means for applying said potential to said limiting means thereby automatically to vary the limiting level of said limiting means in dependence on the amplitude of said intervening portions.

2. Apparatus comprising a television camera including a camera tube having electrodes and connected by cable to a control unit, a signal source for providing at said unit an electrical control signal having recurrent peak extremities and intervening portions having a substantially constant value between recurrent peak extremities, means at said unit for adjusting the amplitude of said signal, means for feeding said signal along said cable to said camera, means at said camera for generating a high voltage, means for isolating said high voltage from said cable, a level setter connected to the output of said isolating means for setting the peaks of said signal at a voltage at a fixed level corresponding substantially to said high voltage, limiting means connected to said level setter for clipping the amplitude of said intervening portions lying between said peaks, an integrating circuit for integrating said intervening portions to provide a potential varying with the amplitude of said intervening portions, and means for applying said potential to said limiting means thereby automatically to vary the limiting level of said limiting means in dependence on the amplitude of said intervening portions and means for applying said intervening portions to an electrode of said camera tube.

3. Apparatus comprising a television camera having a cathode ray beam pick-up tube having electrodes for blacking out the beam of said tube and for controlling the beam current thereof and connected by cable to a control unit, a signal source for providing at said unit an electrical control signal having recurrent pulses and intervening portions having a substantially constant value between said pulses, means at said unit for feeding said signal along said cable to said camera, means at said camera for generating a high voltage, means for isolating said high voltage from said cable, a level setter connected to the output of said isolating means for setting the peaks of said signal at a voltage at a fixed level corresponding substantially to said high voltage, means for applying said level set pulses to a beam blackout electrode of said tube to black out the beam thereof, limiting means connected to said level setter for clipping the amplitude of said intervening portions lying between said peaks, an integrating circuit for integrating said intervening portions to provide a potential varying with the amplitude of said intervening portions, and means for applying said potential to said limiting means thereby automatically to vary the limiting level of said limiting means in dependence on the amplitude of said intervening portions, and means for feeding said amplitude limited intervening portions to a beam current control electrode of said tube to control the beam current thereof.

References Cited in the file of this patent

UNITED STATES PATENTS

| | | |
|---|---|---|
| 2,296,919 | Goldstine | Sept. 29, 1942 |
| 2,299,328 | Kell | Oct. 20, 1942 |
| 2,309,764 | Gottier | Feb. 2, 1943 |
| 2,426,710 | Sonders | Sept. 2, 1947 |